US009072051B2

(12) United States Patent
Chun et al.

(10) Patent No.: US 9,072,051 B2
(45) Date of Patent: *Jun. 30, 2015

(54) METHOD OF MONITORING CONTROL CHANNEL IN WIRELESS COMMUNICATION SYSTEM

(71) Applicant: LG ELECTRONICS INC., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,719

(22) Filed: Jun. 19, 2014

(65) Prior Publication Data
US 2014/0301266 A1 Oct. 9, 2014

Related U.S. Application Data

(63) Continuation of application No. 13/557,093, filed on Jul. 24, 2012, now Pat. No. 8,797,904, which is a
(Continued)

(30) Foreign Application Priority Data

Aug. 14, 2007 (KR) .................. 10-2007-0081981

(51) Int. Cl.
*H04W 52/02* (2009.01)
*H04W 72/12* (2009.01)
*H04W 76/04* (2009.01)

(52) U.S. Cl.
CPC ...... *H04W 52/0251* (2013.01); *H04W 72/1289* (2013.01); *H04W 76/048* (2013.01); *H04W 52/0216* (2013.01); *H04W 52/0229* (2013.01)

(58) Field of Classification Search
CPC .................. H04W 52/0251; H04W 72/1289
USPC .................................................. 370/311, 252
See application file for complete search history.

(56) References Cited

U.S. PATENT DOCUMENTS 6,643,275 B1 11/2003 Gustafsson et al.
6,778,835 B2 8/2004 You et al.
(Continued)

FOREIGN PATENT DOCUMENTS

EP 1509012 2/2005
JP 2003244057 8/2003
(Continued)

OTHER PUBLICATIONS

LG Electronics, "DRX Scheme", 3GPP TSG-RAN WG2 #56bis, R2-070265, Jan. 2007, 4 pages.
(Continued)

*Primary Examiner* — Rasheed Gidado
(74) *Attorney, Agent, or Firm* — Lee, Hong, Degerman, Kang & Waimey

(57) ABSTRACT

A method of monitoring a control channel in a wireless communication system includes monitoring a physical down-link control channel (PDCCH) during a monitored duration, wherein the monitored duration is a part of a discontinuous reception (DRX) period, the DRX period specifying the periodic repetition of the monitored duration followed by a non-monitored duration. By monitoring a control channel during a DRX period, battery consumption of a user equipment can be reduced and an operation time of the user equipment can be increased.

10 Claims, 13 Drawing Sheets

Related U.S. Application Data continuation of application No. 12/526,765, filed as application No. PCT/KR2008/001479 on Mar. 17, 2008, now Pat. No. 8,254,323.

(60) Provisional application No. 60/896,250, filed on Mar. 21, 2007, provisional application No. 60/895,418, filed on Mar. 16, 2007.

(56) References Cited

U.S. PATENT DOCUMENTS

| | | | |
|---|---|---|---|
| 7,079,873 B2 | 7/2006 | Fan et al. | |
| 7,872,986 B2* | 1/2011 | Chun et al. | 370/252 |
| 7,912,471 B2 | 3/2011 | Kodikara Patabandi et al. | |
| 2003/0125037 A1 | 7/2003 | Bae et al. | |
| 2003/0153370 A1 | 8/2003 | Sako | |
| 2004/0014452 A1 | 1/2004 | Lim et al. | |
| 2004/0146019 A1 | 7/2004 | Kim et al. | |
| 2004/0229659 A1* | 11/2004 | Boos et al. | 455/574 |
| 2005/0002361 A1 | 1/2005 | Dick et al. | |
| 2005/0180378 A1 | 8/2005 | Lee et al. | |
| 2006/0126570 A1 | 6/2006 | Kim et al. | |
| 2006/0268772 A1 | 11/2006 | Ko et al. | |
| 2007/0064665 A1 | 3/2007 | Zhang et al. | |
| 2007/0109987 A1 | 5/2007 | Kohlmann et al. | |
| 2007/0183355 A1 | 8/2007 | Kuchibhotla et al. | |
| 2007/0206531 A1 | 9/2007 | Pajukoski et al. | |
| 2007/0230400 A1 | 10/2007 | Kuchibhotla et al. | |
| 2007/0286080 A1 | 12/2007 | Kim et al. | |
| 2007/0291719 A1 | 12/2007 | Demirhan et al. | |
| 2007/0291728 A1 | 12/2007 | Dalsgaard et al. | |
| 2008/0049669 A1 | 2/2008 | Lundby et al. | |
| 2008/0081628 A1 | 4/2008 | Ye et al. | |
| 2008/0101268 A1 | 5/2008 | Sammour et al. | |
| 2008/0108346 A1 | 5/2008 | Umatt et al. | |
| 2008/0117891 A1 | 5/2008 | Damnjanovic et al. | |
| 2008/0167089 A1 | 7/2008 | Suzuki et al. | |
| 2008/0186892 A1* | 8/2008 | Damnjanovic | 370/311 |
| 2008/0214249 A1* | 9/2008 | Kim et al. | 455/574 |
| 2008/0267118 A1 | 10/2008 | Cai et al. | |
| 2008/0273610 A1 | 11/2008 | Malladi et al. | |
| 2009/0252124 A1 | 10/2009 | Yeo et al. | |
| 2010/0135159 A1 | 6/2010 | Chun et al. | |
| 2013/0021935 A1 | 1/2013 | Chun et al. | |

FOREIGN PATENT DOCUMENTS

| | | |
|---|---|---|
| JP | 2005-525761 | 8/2005 |
| JP | 2006-515737 | 6/2006 |
| KR | 10-2005-0040688 | 5/2005 |
| KR | 10-2008-0015704 | 2/2008 |
| TW | 200531489 | 9/2005 |
| WO | 2006-019267 | 2/2006 |
| WO | 2007/013457 | 2/2007 |
| WO | 2007013457 | 2/2007 |
| WO | 2007-025138 | 3/2007 |
| WO | 2007-073118 | 6/2007 |
| WO | 2008/024283 | 2/2008 |

OTHER PUBLICATIONS

Japan Patent Office Application Serial No. 2012-248330, Notice of Allowance dated Nov. 11, 2013, 3 pages.

Samsung, "DRX operations for connected mode UEs in LTE," 3GPP TSG-RAN2 Meeting #56, Tdoc R2-063120, Nov. 2006, 3 pages.
ETRI, "DRX control in LTE_ACTIVE," 3GPP TSG RAN WG2 #56bis, R2-070120, Jan. 2007, 2 pages.
Ericsson, "Issues on DRX in LTE Active," 3GPP TSG-RAN WG2 Meeting #57, R2-070797, Feb. 2007, 3 pages.
3rd Generation Partnership Project (3GPP), "Technical Specification Group Radio Access Network; Physical Channels and Modulation (Release 8)," 3GPP TS 36.211 V1.0.0, Mar. 2007, 30 pages.
Intellectual Property Office of India Application Serial No. 2090/KOLNP/2009, Office Action dated Jul. 11, 2014, 1 page.
Taiwan Intellectual Property Office Application Serial No. 096131304, Certificate dated Sep. 1, 2013, 8 pages.
NTT DoCoMo, Inc., "Uplink Resource Allocation Scheme," R2-062164, 3GPP TSG RAN WG2 #54, Aug. 2006.
Lucent Technologies, "Uplink Scheduling Requests for Real Time Services," R2-062227, 3GPP TSG-RAN2 #54, Aug. 2006.
LG Electronics Inc., "UL Scheduling for VoIP," R2-062927, 3GPP TSG-RAN WG2 #55, Oct. 2006.
InterDigital Communications Corporation, "Periodic Scheduling of Uplink Resources for LTE VoIP," R2-063183, 3GPP TSG RAN WG2 #56, Nov. 2006.
Samsung, "DRX Operations for Connected Mode UEs in LTE," R2-063120, 3GPP TSG-RAN2 Meeting #56, Nov. 2006, XP-050132629.
3rd Generation Partnership Project (3GPP), "Technical Specification Group Radio Access Network; Physical Channels and Modulation (Release 8)," 3GPP TS 36.211, v1.0.0, Mar. 2007, XP-002552926.
Ericsson, "Issues on DRX in LTE Active," R2-070797, 3GPP TSG-RAN WG2 Meeting #57, Feb. 2007, XP-050133822.
ETRI, "DRX Control in LTE_ACTIVE," R2-070120, 3GPP TSG RAN WG2 #56bis, Jan. 2007, XP-050133232.
NTT DoCoMo, Inc., "Views on DRX/DTX Control in LTE," R2-063397, 3GPP TSG RAN WG2 #56, Nov. 2006, XP-007905621.
NTT DoCoMo, Inc., "LTE_ACTIVE DRX Control," R2-070776, 3GPP TSG RAN WG2 #57, Feb. 2007, XP-050133802.
LG Electronics, "DRX Scheme," R2-070265, 3GPP TSG-RAN WG2 #56bis, Jan. 2007, XP-002450413.
LG Electronics, "Initial access procedure," R2-061986, 3GPP TSG RAN WG2#Ad Hoc on LTE, Jun. 2006.
Motorola, "Random Access Procedure and Message Contents," R2-061991, 3GPP TSG-RAN WG2 AH, Jun. 2006.
Intellectual Property Office of India Application Serial No. 682/KOLNP/2009, Office Action dated Mar. 12, 2014, 2 pages.
NTT DoCoMo, Inc., "Uplink resource allocation scheme," 3GPP TSG RAN WG2 #54, R2-062164, Aug. 2006, 5 pages.
Korean Intellectual Property Office Application Serial No. 10-2008-0026344, Notice of Allowance dated Apr. 11, 2014, 2 pages.
Korean Intellectual Property Office Application Serial No. 10-2007-0082053, Office Action dated Dec. 24, 2013, 4 pages.
LG Electronics, "DRX Scheme," 3GPP TSG-RAN WG2 #56bis, R2-070265, Jan. 2007, 4 pages.
The State Intellectual Property Office of the People's Republic of China Application Serial No. 200880002244.6, Office Action dated Mar. 25, 2015, 5 pages.

* cited by examiner

FIG. 4

| Transport Channels | Physical Channels |
|---|---|
| DCH | Dedicated Physical Data Channel (DPDCH) |
| | Dedicated Physical Control Channel (DPCCH) |
| | Fractional Dedicated Physical Channel (F-DPCH) |
| E-DCH | E-DCH Dedicated Physical Data Channel (E-DPDCH) |
| | E-DCH Dedicated Physical Control Channel (E-DPCCH) |
| | E-DCH Absolute Grant Channel (E-AGCH) |
| | E-DCH Relative Grant Channel (E-RGCH) |
| | E-DCH Hybrid ARQ Indicator Channel (E-HICH) |
| RACH | Physical Random Access Channel (PRACH) |
| | Common Pilot Channel (CPICH) |
| BCH | Primary Common Control Physical Channel (P-CCPCH) |
| FACH | Secondary Common Control Physical Channel (S-CCPCH) |
| PCH | |
| | Synchronisation Channel (SCH) |
| | Acquisition Indicator Channel (AICH) |
| | Paging Indicator Channel (PICH) |
| | MBMS Notification Indicator Channel (MICH) |
| HS-DSCH | High Speed Physical Downlink Shared Channel (HS-PDSCH) |
| | HS-DSCH-related Shared Control Channel (HS-SCCH) |
| | Dedicated Physical Control Channel (uplink) for HS-DSCH (HS-DPCCH) |

METHOD OF MONITORING CONTROL CHANNEL IN WIRELESS COMMUNICATION SYSTEM

This application is a continuation of U.S. patent application Ser. No. 13/557,093, filed on Jul. 24, 2012, now U.S. Pat. No. 8,797,904, which is a continuation of U.S. patent application Ser. No. 12/526,765, filed on Jan. 28, 2010, now U.S. Pat. No. 8,254,323, which is the National Stage filing under 35 U.S.C. 371 of International Application No. PCT/KR2008/001479, filed on Mar. 17, 2008, which claims the benefit of earlier filing date and right of priority to Korean Application No. 10-2007-0081981, filed on Aug. 14, 2007, and also claims the benefit of U.S. Provisional Application Serial Nos. 60/896,250, filed on Mar. 21, 2007, and 60/895,418, filed on Mar. 16, 2007, the contents of which are all incorporated by reference herein in their entirety.

TECHNICAL FIELD

The present invention relates to wireless communication, and more particularly, to a method of reducing battery consumption of a user equipment in a wireless communication system.

BACKGROUND ART

A conventional wide code division multiple access (WCDMA)-based wireless communication method is a very effective wireless transmission method in which voice-based data is transmitted at a low speed and a soft handover is taken into consideration, but is ineffective when data is transmitted at a high speed in a multi-path fading environment An evolved-universal mobile telecommunications system (E-UMTS) proposes a downlink transmission speed of about 100 Mbps. In the E-UMTS, as a multiple access technique, orthogonal frequency division multiplexing (OFDM) is mainly concerned in downlink, and a discrete Fourier transform spread OFDM (DFT-S-OFDM) is mainly concerned in uplink in order to minimize a peak-to-average-power-ratio (PAPR) of a user equipment (UE).

FIG. 1 shows a structure of a wireless communication system. The wireless communication system may be have a network structure of an E-UMTS. The E-UMTS may be referred to as a long-term evolution (LTE) system. The wireless communication system can be widely deployed to provide a variety of communication services, such as voices, packet data etc.

Referring to FIG. 1, a E-UMTS is classified into an evolved-UMTS terrestrial radio access network (E-TRAN) and an evolved packet core (EPC). The E-UTRAN includes at least one base station (BS) 20. A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B(eNB), a base transceiver system (BTS), an access point, etc. There are one or more cells within the coverage of the BS 20.

Interfaces for transmitting user traffic or control traffic may be used between the BSs 20. Hereinafter, downlink is defined as communication from the BS 20 to the UE 10, and uplink is defined as communication from the UE 10 to the BS 20.

The BS 20 provides the UE 10 with an end-to-end point of a user plane and a control plane. The BSs 20 are interconnected by means of an X2 interface, and may have a meshed network structure in which the X2 interface always exists between the neighboring BSs 20.

The BSs 20 are also connected by means of an S1 interface to the EPC, more specifically, to an access gateway (aGW) 30. The aGW 30 provides an end-to-end point for a session and mobility management function the UE 10. The S1 interface may be provided between the BS 20 and the aGW 30 so that a plurality of nodes can be interconnected in a many-to-many manner. The aGW 30 can be classified into a part for processing user traffic and a part for processing control traffic. In this case, for inter-communication, a new interface may be used between an aGW for processing new user traffic and an aGW for processing new control traffic. The aGW 30 is also referred to as a mobility management entity/user plane entity (MME/UPE).

Layers of a radio interface protocol between a UE and a network can be classified into L1 layer (a first layer), L2 layer (a second layer), and L3 layer (a third layer) based on the lower three layers of the open system interconnection (OSI) model that is well-known in a communication system. A physical layer belongs to the first layer and provides an information transfer service on a physical channel. A radio resource control (RRC) layer belongs to the third layer and serves to control radio resources between the UE and the network. The UE and the network exchange RRC messages via the RRC layer. The RRC layer may be located in network nodes (i.e., a BS, an aGW, etc.) in a distributed manner, or may be located only in the BS or the aGW.

The radio interface protocol horizontally includes a physical layer, a data link layer, and a network layer, and vertically includes a user plane for data information transfer and a control plane for control signaling delivery.

FIG. 2 is a diagram showing a control plane of a radio interface protocol. FIG. 3 is a diagram showing a user plane of the radio interface protocol. In FIGS. 2 and 3, a structure of the radio interface protocol between a UE and an E-UTRAN is based on the third generation partnership project (3GPP) wireless access network standard.

Referring to FIGS. 2 and 3, a physical layer belonging to a first layer provides an tipper layer with an information transfer service on a physical channel. The physical layer is coupled with a media access control (MAC) layer, i.e., an upper layer of the physical layer, via a transport channel. Data is transferred between the MAC layer and the physical layer on the transport channel. In addition, data is transferred between different physical layers, i.e., between physical layers of a transmitting side and a receiving side.

The MAC layer in a second layer provides services to a radio link control (RLC) layer, i.e., an upper layer of the MAC layer, via a logical channel. The RLC layer in the second layer supports reliable data transfer. Functions of the RLC layer can be implemented as a function block included in the MAC layer. In this case, as indicated by a dotted line, the RLC layer may not exist.

A packet data convergence protocol (PDCP) belonging to the second layer performs a header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet through a radio interface.

An RRC layer belonging to a third layer is defined only in the control plane. The RRC layer serves to control the logical channel, the transport channel, and the physical channel in association with configuration, reconfiguration, and release of radio bearers (RBs). An RB is a service provided by the second layer for data transmission between the UE and the E-UTRAN. The RB is a logical path provided by the first and second layers of the radio protocol to deliver data between the UE and the E-UTRAN. In general, when the RB is established, characteristics of radio protocol layers and channels required to provide as specific service are defined, and all specific parameters and operation methods are determined.

A downlink transport channel transmits data from the network to the UE. Examples of the downlink transport channel include a broadcast channel (BCH) for transmitting system information and a downlink-shared channel (DL-SCH) for transmitting user traffic or control messages. User traffic of downlink multicast or broadcast services or control messages can be transmitted on the DL-SCH or a downlink multicast channel (MCH). An uplink transport channel transmits data from the UE to the network. Examples of the uplink transport channel include a random access channel (RACH) for transmitting initial control messages and an uplink-shared channel (UL-SCH) for transmitting user traffic or control messages. A paging channel (PCH) may be provided to deliver paging information.

FIG. 4 shows an example of mapping of logical channels onto physical channels in a WCDMA system. The section 6.1 of 3GPP TS 25.211 V6.7.0 (2005-12) "Technical Specification Group Radio Access Network; Physical channels and mapping of transport channels onto physical. channels (FDD) (Release 6)" can be incorporated herein by reference.

Referring to FIG. 4, logical channels are a dedicated channel (DCH), an enhanced dedicated channel (E-DCH), a random access channel (RACH), a broadcast channel (BCH), a forward access channel (FACH), a paging channel (PCH), and a high speed downlink shared channel (HS-DSCH). The logical channels are mapped to various physical channels.

FIG. 5 shows an example of mapping of logical channels onto physical channels in an E-UTRAN. The section 5.3.I of 3GPP TS 36.300 V0.9.0 (2007-03) "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" can be incorporated herein by reference.

Referring to FIG. 5, downlink transport channels (i.e., a DL-SCH, a PCH, and an MCH) except for a BCH are mapped to a physical downlink shared channel (PDSCH). A control channel among downlink physical channels may be a physical downlink control channel (PDCCH). Comparing FIG. 4 and FIG. 5, unlike the WCDMA system using various physical channels, the E-UTRAN uses only two downlink physical channels, i.e., the PDSCH for traffic data and the PDCCH for a control signal.

In order to receive the PDSCH, a UE first has to monitor the PDCCH. After successfully decoding the PDCCH, the UE can receive the PDSCH by using scheduling information included in the PDCCH. However, since the PDCCH is an almost unique control channel, the PDCCH is transmitted every transmission time interval (TTI). The TTI is a unit of scheduling performed by a BS. The TTI is defined as a time for transmitting one sub-frame. For example, 1 TTI may be 1 ms.

Unlike the WCDMA system capable of monitoring only a control channel designed for a specific purpose, the UE in the E-URTAN needs to monitor the PDCCH every TTI in order to check the scheduling information of the UE. However, when the scheduling information of the UE is checked every TTI, the UE may experience significant battery consumption due to a relatively short TTI length.

DISCLOSURE OF INVENTION

Technical Problem

A method is sought for monitoring a control channel to reduce battery consumption of a user equipment.

Technical Solution

In an aspect, a method of monitoring a control channel in a wireless communication system is provided. The method includes monitoring a physical downlink control channel (PDCCH) during a monitored duration, wherein the monitored duration is a part of a discontinuous reception (DRX) period, the DRX period specifying the periodic repetition of the monitored duration followed by a non-monitored duration.

In another aspect, a method of monitoring a control channel in a wireless communication system is provided. The method includes monitoring a PDCCH during a monitored duration, wherein the monitored duration is a part of a DRX period, the DRX period specifying the periodic repetition of the monitored duration followed by a non-monitored duration, and monitoring the PDCCH during an extended period when the PDCCH is successfully decoded during the monitored duration.

Advantageous Effects

By monitoring a control channel during a discontinuous reception (DRX) period, battery consumption of a user equipment (UE) can be reduced in an evolved-universal mobile telecommunications system (E-UMTS), and an operation time of the UE can be increased.

BRIEF DESCRIPTION OF THE DRAWINGS

FIG. 4 shows an example of mapping of logical channels onto physical channels in a wide code division multiple access (WCDMA) system.

MODE FOR THE INVENTION

Figure 1:
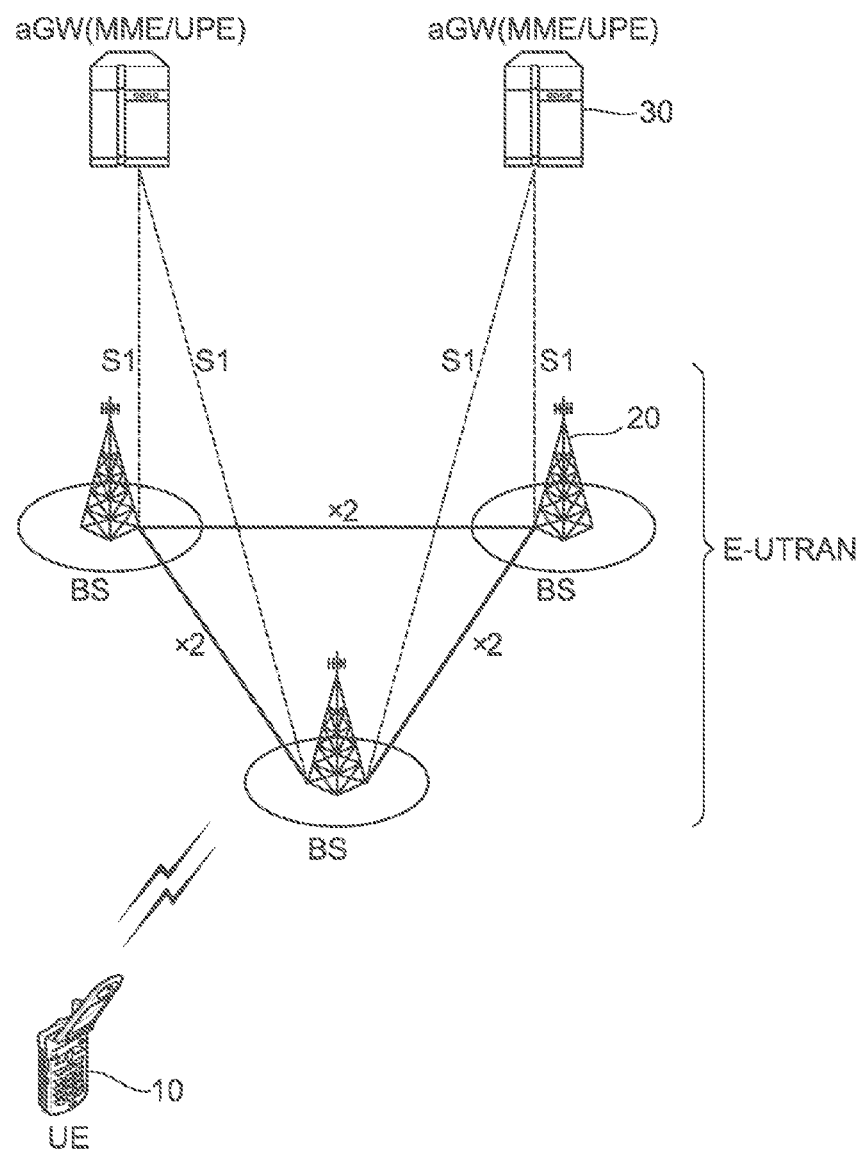
FIG. 1 shows a structure of a wireless communication system.
Figure 2:
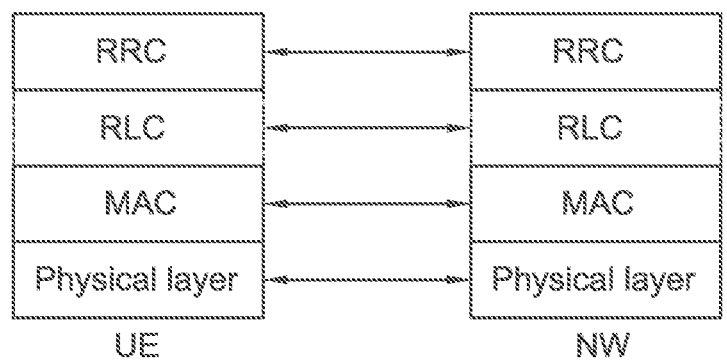
FIG. 2 is a diagram showing a control plane of a radio interface protocol.
Figure 3:
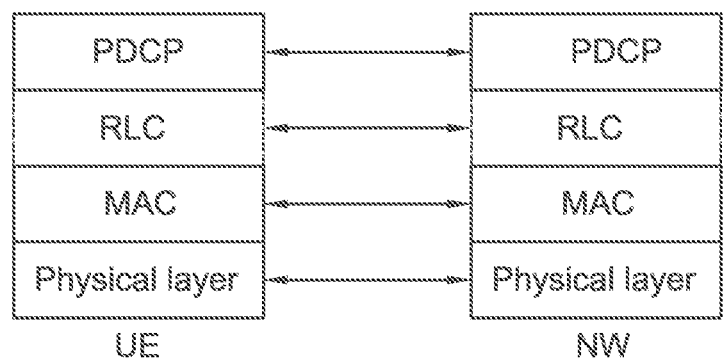
FIG. 3 is a diagram showing a user plane of a radio interface protocol.
Figure 5:
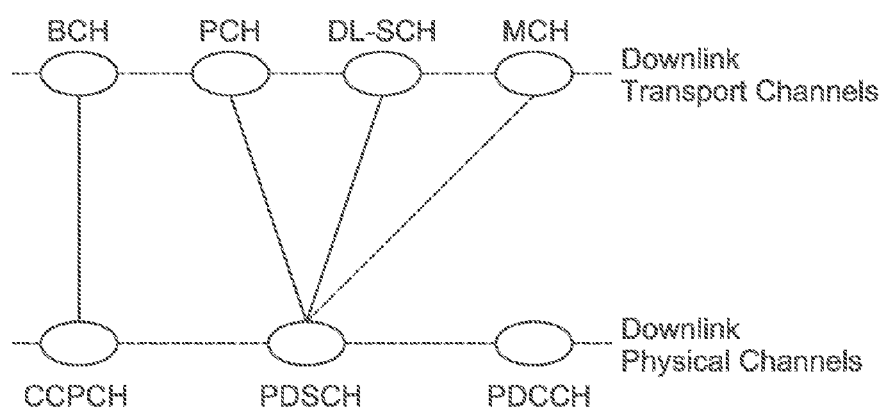
FIG. 5 shows an example of mapping of logical channels onto physical channels in an evolved-universal mobile telecommunications system (E-UMTS).

A user equipment (UE) monitors a downlink control channel during a monitored duration which exists for each discontinuous reception (DRX) period. The monitored duration is defined by the number of consecutive transmission time intervals (TTIs).

Every DRX period, the UE detects whether scheduling information of the UE itself is transmitted on a downlink control channel during a specific checking period. Upon detecting the scheduling information, the UE receives data by using the scheduling information.

During the monitored duration, when no scheduling information of the UE is received from a base station (BS), the UE does not monitor the downlink control channel during the remaining cycles of the DRX period.

When the BS establishes the DRX period of the control channel, every DRX period, the UE monitors the control channel only during the monitored duration, and stops monitoring of the control channel during a non-monitored duration.

When the scheduling information of the UE is detected on the downlink control channel, that is, when decoding of the downlink control channel is successful, the UE can continuously monitor the downlink control channel during an extended period even after the monitored duration is over.

When the scheduling information of the UE is detected on the downlink control channel, the UE can enter a continuous reception mode. In the continuous reception mode, the UE can continuously receive the downlink control channel until a specific condition is satisfied.

There may be an occasion in which, after the UE enters the continuous reception mode from a discontinuous reception mode, the UE re-enters the discontinuous reception mode from the continuous mode. This occasion may occur when the UE does not detect the scheduling information of the UE on the downlink control channel during a specific time period after the UE enters the continuous reception mode.

Such an occasion may also occur when the UE receives from the BS an instruction, which allows the UE to enter the discontinuous reception mode, alter the UE enters the continuous reception mode.

When the scheduling information is detected within the monitored duration, the UE can extend the monitored duration. The UE can monitor the downlink control channel for the extended time period even if the monitored duration is over.

The downlink control channel may be any one of a paging channel and L1/L2 control channel which delivers information regarding on radio resource allocation. The L1/L2 control channel is also referred to as a physical downlink control channels (PDCCH). The downlink control channel carries resource allocation information on which the UE receives data on a downlink shared channel (DL-SCH) or on which the UE transmits data on an uplink shared channel (UL-SCH). The downlink control channel carries scheduling assignment information of the UE. Scheduling assignment may be uplink assignment and/or downlink assignment. When the downlink control channel is successful decoded, the UE can recognize that the scheduling information of the UE is being delivered on the downlink control channel.

The BS can inform the UE of information which indicates whether DRX is configured to monitor the control channel, information on a DRX period and a monitored duration, information on an extended period, etc.

The BS can inform the UE of configuration information indicating a minimum possible number of sub-frames (or a time duration) which follow an n-th sub-frame and in which the UE has to monitor the downlink control channel.

The BS can inform the UE of information (i.e., configuration information of the DRX period) on a repetition period of the monitored duration in which the UE monitors the downlink control channel.

The BS may monitor the control channel only during the monitored duration of the DRX period, and inform the UE of DRX configuration information indicating whether to stop monitoring during the non-monitored duration.

Upon detecting the scheduling information of the UE, the BS can inform the UE of information on an extended period in which the DRX period is inactivated and the downlink control channel is continuously monitored.

Information on the monitored duration or the extended period may be represented by sub-frame to which the downlink control channel is allocated. The information on the monitored duration or the extended period may be represented by the number of consecutive sub-frames to be monitored. Alternatively, the information on the monitored duration or the extended period may be represented by the number of consecutive TTIs for monitoring the downlink control channel. For example, the monitored duration is indicated by only one sub-frame, the UE monitors the downlink control channel only in the one sub-frame. Therefore, if there is data or control information to be transmitted to the UE, the BS has to inform this only on the downlink control channel allocated to the sub-frame belonging to the monitored duration. However, when the system experiences power shortage, or when a large amount of data has to be transmitted to another user, the BS has to give up data transmission of another user in order to inform the UE of the existence of data. That is, when only one sub-frame is included in the monitored duration of the UE, the BS experiences significant limits in utilizing radio resources. Therefore, it is effective to define a plurality of consecutive sub-frames (or a plurality of TTIs) in the monitored duration or the extended period.

Figure 6:
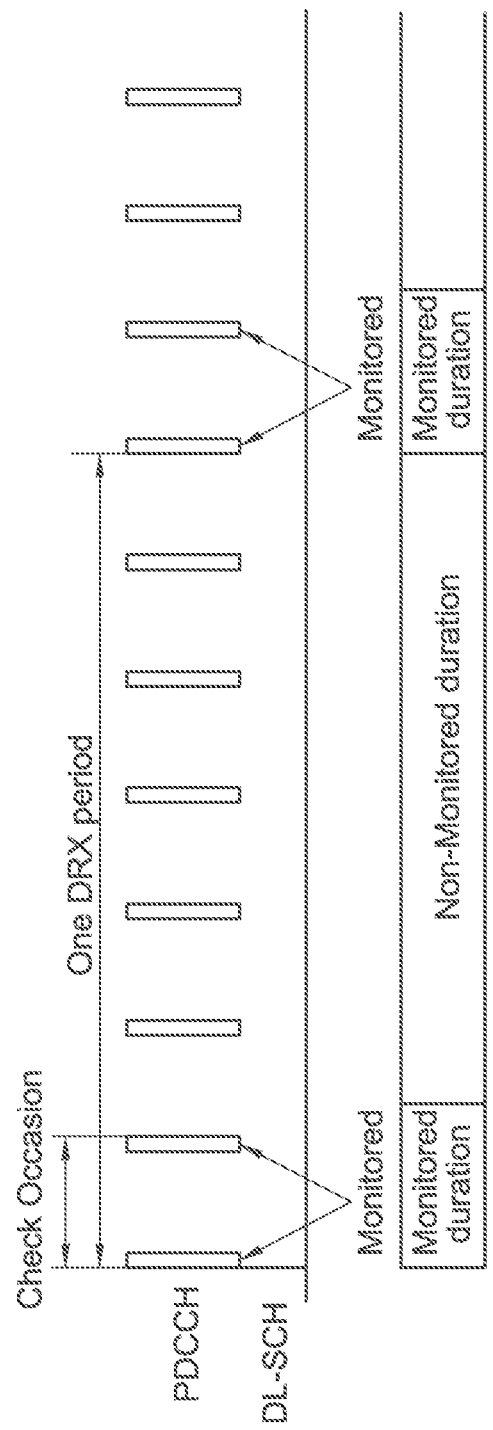
FIG. 6 shows an example of a method of monitoring a control channel according to an embodiment of the present invention.

FIG. 6 shows an example of a method of monitoring at control channel according to an embodiment of the present invention.

Referring to FIG. 6, a DRX period has a length of 7 TTIs and a monitored duration has a length of 2 TTIs. The remaining cycles of the DRX period, that is, a non-monitored duration, have a length of 7 TTIs. The length of the monitored duration is defined by the number of consecutive TTIs. The TTI is a unit of scheduling radio resources. The TTI is a time required to transmit one sub-frame. At least one PDCCH and at least one physical downlink shared channel (PDSCH) can be allocated to one sub-frame.

A BS can inform a LIE of the length of the monitored duration. The monitored duration is a part of the DRX period. The DRX period specifies periodic repetition of the monitored duration followed by the non-monitored duration.

Every DRX period, the UE monitors at least one PDCCH during the monitored duration. The PDCCH is a control channel carrying scheduling assignment (e.g., uplink assignment or downlink assignment). If decoding is not successfully performed on the PDCCH during the monitored duration, the UE stops the monitoring of the PDCCH during the non-monitored duration. The BS can inform the UE of information (i.e., DRX configuration) indicating whether the PDCCH is monitored during the non-monitored duration.

The UE monitors the PDCCH during the monitored duration. The UE may wake up only during the monitored duration to perform uplink transmission or downlink transmission. For example, the UE may periodically report a channel quality indicator (CQI) to the BS during the monitored duration.

Figure 7:
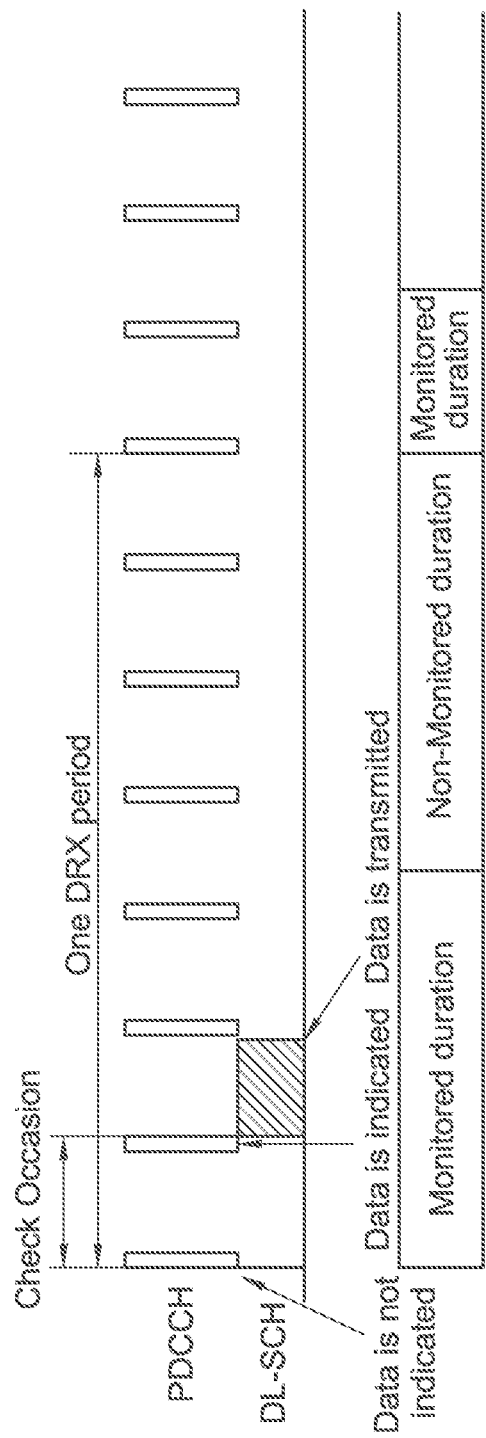
FIG. 7 shows an example of a method of monitoring a control channel according to an embodiment of the present invention.

FIG. 7 shows an example of a method of monitoring a control channel according to an embodiment of the present invention.

Referring to FIG. 7, every DRX period, a UE monitors a PDCCH during a monitored duration. When decoding is successfully performed on the PDCCH during the monitored duration, that is, when data to be transmitted to the UE is detected, data on a DL-SCH is received by using information indicated on the PDCCH.

When the UE successfully receives the PDCCH on which uplink assignment or downlink assignment is indicated during the monitored duration, the PDCCH can be monitored during an extended period. In this example, data is indicated at 2 TTIs, and the monitored duration is further extended. If the PDCCH is not successfully decoded during the extended period, the UE re-enters the DRX period. The BS can inform the UE of information on the extended period. In particular, if there is scheduling information for the UE is found, the UE enters a non-DRX mode (i.e., continuous reception mode) during which discontinuous reception (DRX) is inactivated. Further, the UE may continue to monitor the PDCCH until a command message is received. Upon receiving the command message, the UE enters a DRX mode (i.e., discontinuous reception mode) during which discontinuous reception (DRX) is activated and the DRX period is applied. Alternatively, the UE may continue to monitor the PDCCH while a timer is running.

Figure 8:
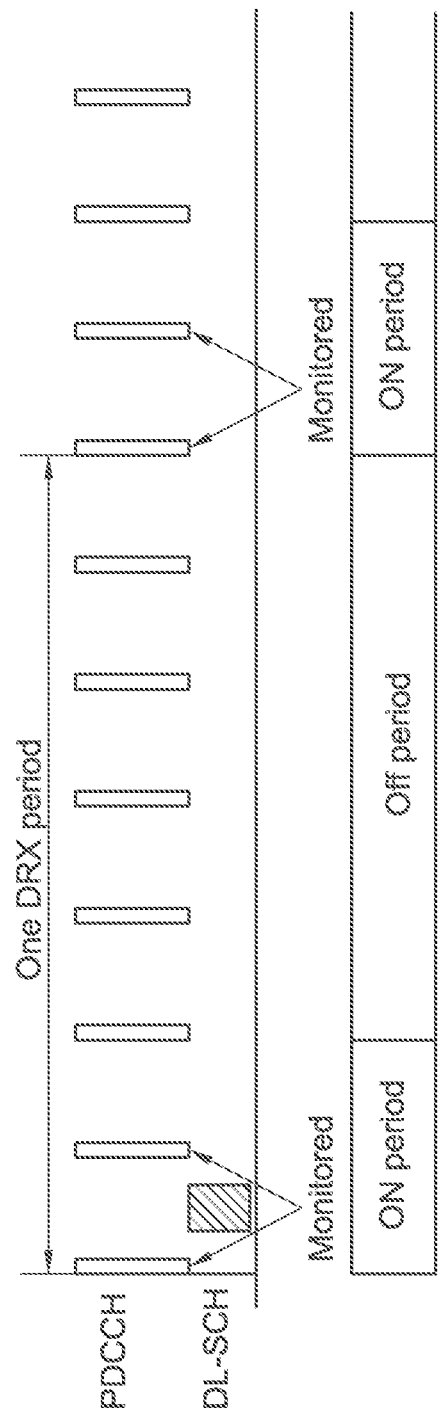
FIG. 8 shows an example of a method of monitoring a control channel according to an embodiment of the present invention.

FIG. 8 shows an example of a method of monitoring a control channel according to an embodiment of the present invention.

Referring to FIG. 8, a DRX period, is divided into an on-period and an off-period. The on-period is a period in which a UE monitors a PDCCH. The off-period is a period in which the UE stops monitoring the PDCCH and enters DRX sleep mode. A BS can inform the UE of information on the on-period or the off-period. When the UE successfully receives the PDCCH during the off-period, downlink data can be received on DL-SCH.

The on-period is defined by the number of consecutive TTIs. The off-period may also be defined by the number of consecutive. TTIs.

The on-period and the off-period may have fixed lengths. That is, during the on-period, the UE may do not change the length of the on-period or the off-period even if scheduling information is detected on the PDCCH. In this case, the on-period and the off-period of the UE have invariable lengths. Therefore, when the on-period is over, the UE transitions to the off-period regardless of whether transmission information is received during the on-period. That is, although the PDCCH has been successfully received at the first 2 TTIs, the UE does not monitor the PDCCH during the off-period, starting from a time point when the off-period begins.

Figure 9:
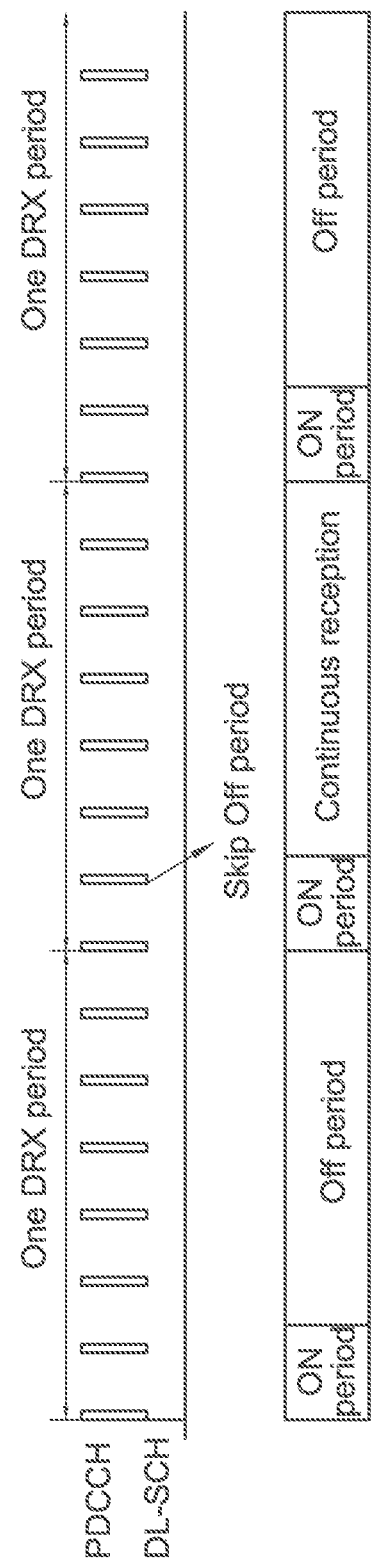
FIG. 9 shows an example of a method of monitoring a control channel according to an embodiment of the present invention.

FIG. 9 shows an example of a method of monitoring a control channel according to an embodiment of the present invention.

Referring to FIG. 9, a BS instructs a UE to skip an off-period during a specific DRX period. Scheduling information may not be received within a previous on-period due to a large amount of data or control information to be sent from the BS to the UE. In this case, it can be instructed such that the off-period of the specific DRX period is skipped during the specific DRX period, and thus a current mode can be switched to a continuous reception mode only during the specific DRX period. Alternatively, in this case, it can be instructed such that the UE switches the current mode to continuously receive data by stopping DRX configuration. When the instruction for skipping the off-period is received, the UE does not enter the off-period and performs an operation in the on-period amounting to the skipped periods of time.

Figure 10:
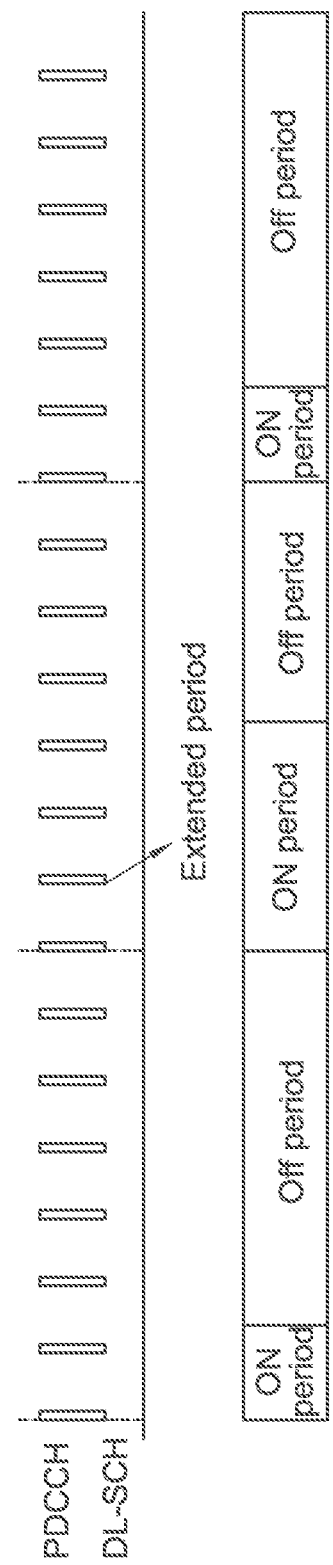
FIG. 10 shows an example of a method of monitoring a control channel according to an embodiment of the present invention.

FIG. 10 shows an example of a method of monitoring a control channel according to an embodiment of the present invention.

Referring to FIG. 10, when a PDCCH is successfully decoded during an on-period of a specific DRX period, the PDCCH can be further monitored for a time period amounting to an extended period. The extended period is defined by the number of consecutive TTIs for monitoring the PDCCH when downlink transmission is expected. Herein, the PDCCH is successfully decoded during an on-period having a length of 2 TTIs, and the PDCCH is monitored during an extended period having a length of 2 TTIs. Therefore, a total length of the monitored duration is 4 TTIs.

While receiving the downlink control channel during the on-period, when scheduling assignment (e.g., downlink assignment or uplink assignment) of the UE is detected on the downlink control channel, the UE further monitors the PDCCH for a time period amounting to the extended period. If the PDCCH is not successfully decoded during the extended period, the UE re-enters the DRX period.

The BS can instruct the UE to switch to a continuous reception mode continuously during an on-period in a next DRX period, or switch to the continuous reception mode only during several DRX periods, or extends a length of the on-period. Even after the UE switches to the continuous reception mode, the BS can instruct the UP to transition to the off-period. While staying in the continuous reception mode, when the BS instructs the UE to transition to the off-period, the UE ends the continuous reception mode and transitions to the it period.

Figure 11:
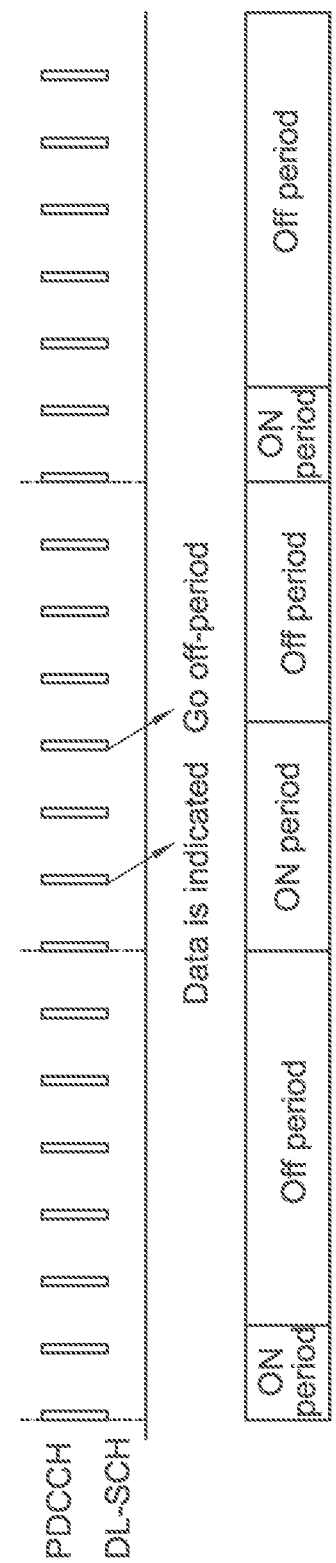
FIG. 11 shows an example of a method of monitoring a control channel according to an embodiment of the present invention.

FIG. 11 shows an example of a method of monitoring a control channel according to an embodiment of the present invention.

Referring to FIG. 11, when a PDCCH is successfully decoded during an on-period, a UE inactivates an off-period, and further monitors the PDCCH for a time period amounting to an extended period. A BS can instruct the UE to transition to the off-period during the extended period. That is, the UE can enter a DRX period directly under the instruction of the BS instead of entering the DRX period after the extended period is over.

Figure 12:
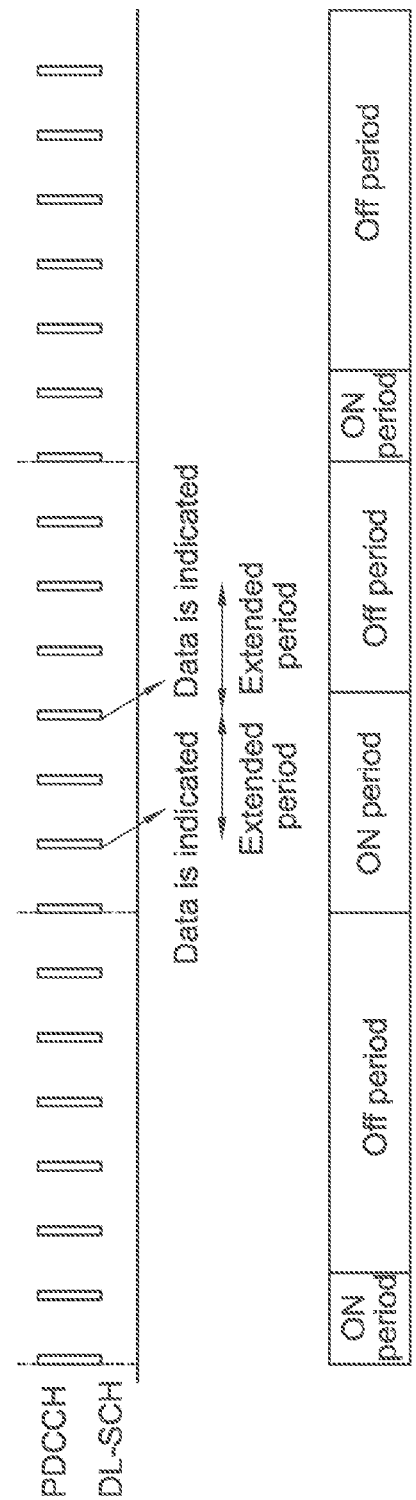
FIG. 12 shows an example of as method of monitoring a control channel according to an embodiment of the present invention.

FIG. 12 shows an example of a method of monitoring a control channel according to an embodiment of the present invention.

Referring to FIG. 12, when data is indicated, a plurality of extended periods exist. That is, when a PDCCH is successfully decoded during an on-period, a UE further monitors the PDCCH during an extended period. If the PDCCH is successfully decoded only during the extended period, the UE continuously monitors the PDCCH during an additionally extended period. When data is indicated during an on-period, the PDCCH can be continuously monitored during a plurality of extended periods after the on-period of a corresponding DRX period is over.

After receiving the data indication, the UE continuously monitors the PDCCH during the extended period in order to receive subsequent downlink transmission. When data indication is received again, the UE continuously monitors again the PDCCH during another extension period. If existence of data is no longer indicated during the additional extension period, the UE re-enters the DRX period.

Although the control channel is transmitted at a relatively short transmission period, the UE monitors the control channel only during the on-period and does not monitor the control channel during the off-period. The BS can inform the UE of DRX configuration by using a media access control (MAC) message or a radio resource control (RRC) message. When the control channel is monitored by using a DRX method, battery consumption of the UE can be reduced.

Figure 13:
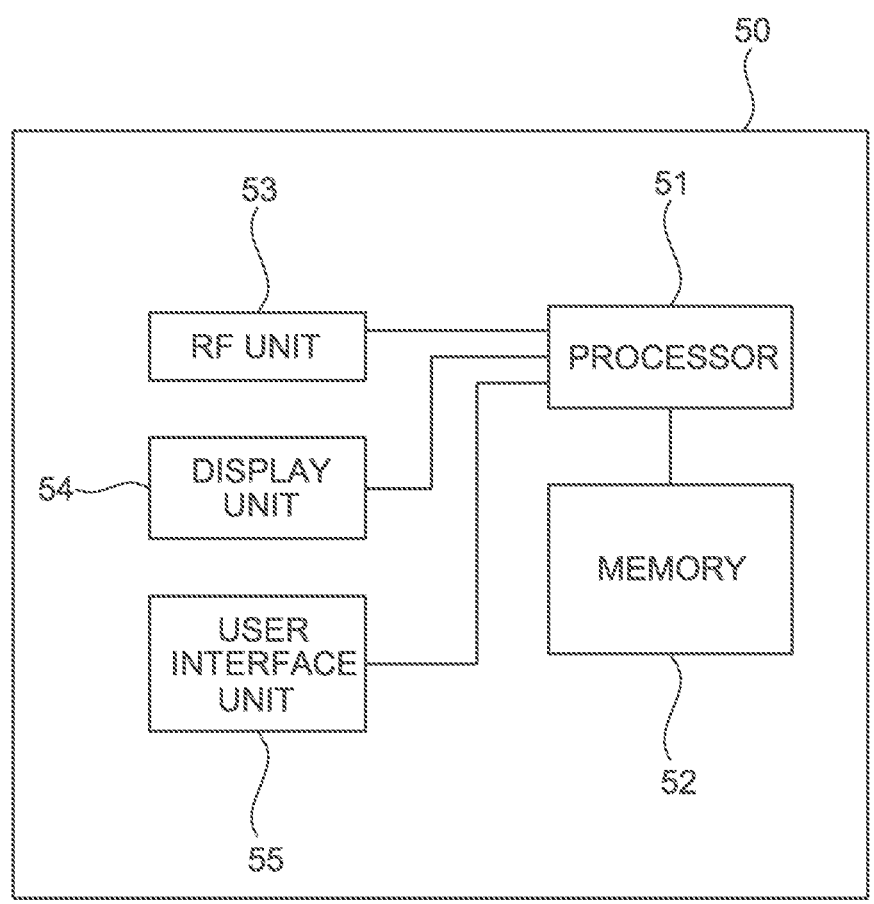
FIG. 13 is a block diagram showing constitutional elements of a user equipment.

FIG. 13 is a block diagram showing constitutional elements of a UE. A UE 50 includes a processor 51, at memory 52, a radio frequency (RF) unit 53, a display unit 54, and at user interface unit 55. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RE unit 53 is coupled to the processor 51 and transmits and/or receives radio signals.

Layers of the radio interface protocol are implemented in the processor 51. The processor 51 provides a control plane and a user plane. A monitoring function of the control channel can be implemented in the processor 51.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable, logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of monitoring a control channel in a wireless communication system, the method comprising:
    receiving information associated with a discontinuous reception (DRX) period, wherein the DRX period includes a monitored duration and an unmonitored duration;
    monitoring a downlink control channel during the monitored duration;
    determining whether the downlink control channel is successfully decoded by a user equipment (UE) during the monitored duration;
    if the downlink control channel is successfully decoded by the UE during the monitored duration, continuing monitoring the downlink control channel while a timer set for an extended duration is running; and
    entering a DRX mode after the timer expires.

2. The method of claim 1, wherein entering the DRX mode comprises:
    stopping monitoring the downlink control channel during the unmonitored duration following the extended duration; and
    monitoring the downlink control during a subsequent duration following the unmonitored duration.

3. The method of claim 1, wherein the information associated with the DRX period is received via radio resource control (RRC) signaling.

4. The method of claim 1, wherein the downlink control channel is a physical layer channel.

5. The method of claim 1, wherein the downlink control channel comprises scheduling information of a resource allocation.

6. A user equipment (UE) in a wireless communication system, comprising:
    a receiver; and
    a processor coupled to the receiver and configured to:
        receive information associated with a discontinuous reception (DRX) period, wherein the DRX period includes a monitored duration and an unmonitored duration;
        monitor a downlink control channel during the monitored duration;
        determine whether the downlink control channel is successfully decoded by the UE during the monitored duration;
        if the downlink control channel is successfully decoded by the UE during the monitored duration, continue monitoring the downlink control channel while a timer set for an extended duration is running; and
        enter a DRX mode after the timer expires.

7. The UE of claim 6, wherein the processor is further configured to:
    when entering the DRX mode, stop monitoring the downlink control channel during the unmonitored duration following the extended duration; and
    monitor the downlink control during a subsequent duration following the unmonitored duration.

8. The UE of claim 6, wherein the information associated with the DRX period is received via radio resource control (RRC) signaling.

9. The UE of claim 6, wherein the downlink control channel is a physical layer channel.

10. The UE of claim 6, wherein the downlink control channel comprises scheduling information of a resource allocation.

* * * * *